US011836442B2

(12) United States Patent
Nakagawa

(10) Patent No.: US 11,836,442 B2
(45) Date of Patent: Dec. 5, 2023

(54) INFORMATION PROCESSING APPARATUS, METHOD, AND STORAGE MEDIUM FOR ASSOCIATING METADATA WITH IMAGE DATA

(71) Applicant: CANON KABUSHIKI KAISHA, Tokyo (JP)

(72) Inventor: Masashi Nakagawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/199,230

(22) Filed: Mar. 11, 2021

(65) Prior Publication Data
US 2021/0286941 A1 Sep. 16, 2021

(30) Foreign Application Priority Data
Mar. 13, 2020 (JP) ................................. 2020-044448

(51) Int. Cl.
*G06F 40/174* (2020.01)
*G06F 3/0489* (2022.01)
(Continued)

(52) U.S. Cl.
CPC .......... *G06F 40/174* (2020.01); *G06F 3/0362* (2013.01); *G06F 3/03543* (2013.01);
(Continued)

(58) Field of Classification Search
CPC .. G06F 40/174; G06F 3/0489; G06F 3/03543; G06F 3/0362; G06F 3/04842;
(Continued)

(56) References Cited
U.S. PATENT DOCUMENTS 7,913,184 B1 * 3/2011 Zhang .................. G06F 40/174
715/780
9,396,003 B2 * 7/2016 Tanimoto ............ G06F 3/04895
(Continued)

FOREIGN PATENT DOCUMENTS

JP       S6251866 A      3/1987
JP       2000155633 A    6/2000
(Continued)

OTHER PUBLICATIONS

Pane; May 23, 2018; Encyclopedia.com; pp. 1-4.*
(Continued)

*Primary Examiner* — Andrew R Dyer
(74) *Attorney, Agent, or Firm* — CANON U.S.A., INC. IP Division

(57) ABSTRACT

According to an exemplary embodiment of the present disclosure, a screen including a first pane in which a document image is displayed, and a plurality of entry fields in which metadata is to be entered is displayed. In a case where one of character regions in the document image displayed in the first pane is selected by a user, a character recognition result of the selected character region is entered in an entry field that is identified as an input destination among the plurality of entry fields. In a case where the plurality of entry fields includes at least one blank entry field, one of the at least one blank entry field is automatically identified as a next input destination. Accordingly, operability can be improved in entering metadata using character recognition results of character regions selected on the document image.

11 Claims, 14 Drawing Sheets

(51) Int. Cl.
*G06F 3/0354* (2013.01)
*G06F 3/0362* (2013.01)
*G06V 30/412* (2022.01)
*G06V 30/14* (2022.01)
*G06V 30/414* (2022.01)
*G06V 30/416* (2022.01)
*G06F 3/04842* (2022.01)
*G06V 30/10* (2022.01)

(52) U.S. Cl.
CPC ........ *G06F 3/0489* (2013.01); *G06V 30/1456* (2022.01); *G06V 30/412* (2022.01); *G06V 30/414* (2022.01); *G06V 30/416* (2022.01); *G06F 3/04842* (2013.01); *G06F 2203/04803* (2013.01); *G06V 30/10* (2022.01)

(58) Field of Classification Search
CPC ............ G06F 2203/04803; G06K 9/03; G06K 9/00449; G06K 2209/01
USPC .......................................................... 715/224
See application file for complete search history.

(56) References Cited

U.S. PATENT DOCUMENTS

| | | | |
|---|---|---|---|
| 9,910,842 B2* | 3/2018 | Hu | G06F 40/174 |
| 10,528,626 B2* | 1/2020 | Gregg | G06F 16/93 |
| 10,922,481 B2* | 2/2021 | Onuma | G06F 40/174 |
| 2002/0013788 A1* | 1/2002 | Pennell | G06Q 30/0633 |
| | | | 715/224 |
| 2005/0005234 A1* | 1/2005 | Chen | G06F 40/174 |
| | | | 715/221 |
| 2010/0017742 A1* | 1/2010 | Rhodes | G06F 3/0482 |
| | | | 715/780 |
| 2010/0037158 A1* | 2/2010 | Commarford | G06F 3/04842 |
| | | | 715/764 |
| 2013/0050512 A1* | 2/2013 | Gonser | G06F 21/6209 |
| | | | 348/207.1 |
| 2013/0061124 A1* | 3/2013 | Patton | G06F 40/174 |
| | | | 715/224 |
| 2014/0258828 A1* | 9/2014 | Lymer | G06F 40/174 |
| | | | 715/224 |
| 2014/0359418 A1* | 12/2014 | Balamurugan | G06F 40/174 |
| | | | 715/222 |
| 2015/0149168 A1* | 5/2015 | Stent | G10L 15/26 |
| | | | 704/235 |
| 2015/0254225 A1* | 9/2015 | Chirca | G06F 40/174 |
| | | | 715/224 |
| 2015/0317296 A1* | 11/2015 | Vohra | G06F 40/174 |
| | | | 715/221 |
| 2016/0110334 A1* | 4/2016 | Yu | G06F 40/177 |
| | | | 715/223 |
| 2018/0089158 A1* | 3/2018 | Mehta | G06F 3/0482 |
| 2018/0174243 A1* | 6/2018 | Mishra | G06F 40/174 |
| 2020/0074169 A1* | 3/2020 | Mukhopadhyay | G06Q 50/18 |
| 2020/0175100 A1* | 6/2020 | Paterson | G06F 40/174 |
| 2020/0364449 A1* | 11/2020 | Kawabe | G06V 10/761 |
| 2021/0271716 A1* | 9/2021 | Watanabe | G06F 16/93 |

FOREIGN PATENT DOCUMENTS

| | | |
|---|---|---|
| JP | 2011232925 A | 11/2011 |
| JP | 2012053911 A | 3/2012 |
| JP | 2019041150 A | 3/2019 |

OTHER PUBLICATIONS

"Metadata;" Microsoft Computer Dictionary; May 1, 2002; Fifth Edition; p. 336.*
PDF File Format; Feb. 26, 2020; pdg.lbl.gov/; p. 1.*
Trademarks; toolscenter.lenovofiles.com; p. 1.*
Trademarks; public.dhe.ibm.com; p. 1.*

* cited by examiner

FIG. 4

401 — Preview
Please select any metadata first in Metadata pane.

402 —
PURCHASE ORDER

Company Name: XYZ Corporation
Address: 1 Pumpkin Road, New York, NY
Phone: (123)456-7890

Total Quantity: 25
Total Price($): 2,150.00

411 — Metadata
- 412 Customer Name
  - 413 + Please select an OCR region.
- 414 Address
  - 415 + Please select an OCR region.
- 416 Telephone Number
  - 417 + Please select an OCR region.

Cancel   Register

421 —
422 PURCHASE ORDER
423 Company Name: 424 XYZ Corporation (0, 0) x, y — ORIGIN OF DOCUMENT

FIG.5

Preview — 501

Metadata — 511

Customer Name — 512, 513
XYZ Corporation — 514

Address — 515
XYZ Corporation
+ Please select an OCR region.

Telephone Number — 516
+ Please select an OCR region.

Register
Cancel

PURCHASE ORDER

Company Name: XYZ Corporation
Address: 1 Pumpkin Road, New York, NY
Phone: (123)456-7890

Total Quantity: 25
Total Price($): 2,150.00

FIG. 7A

Preview — 700

PURCHASE ORDER

Company Name: XYZ Corporation — 701
Address: 1 Pumpkin Road, New York, NY — 702
Phone: (123)456-7890

Total Quantity: 25
Total Price($): 2,150.00

Metadata — 710

Customer Name — 711
XYZ Corporation
XYZ Corporation

Address — 712
1 Pumpkin Road, New York, NY
1 Pumpkin Road, New York, NY

Telephone Number — 713
+ Please select an OCR region.

Cancel    Register — 714

Preview — 900

PURCHASE ORDER

Company Name: XYZ Corporation
Address: 1 Pumpkin Road, New York, NY — 902
Phone: (123)456-7890

Total Quantity: 25
Total Price($): 2,150.00

Metadata — 910

Customer Name
XYZ Corporation
XYZ Corporation

Address
1 Pumpkin Road, New York, NY
— 912

Telephone Number
Please select an OCR region.

Cancel   Register

FIG.11

1100
Preview

PURCHASE ORDER

Company Name: XYZ Corporation ~1105
Address: 1 Pumpkin Road, New York, NY
Phone: (123)456-7890

Total Quantity: 25
Total Price($): 2,150.00

Metadata
- Customer Name
  - XYZ Corporation
  - XYZ Corporation ~1111
- Address
  - + Please select an OCR region. ~1112
- Telephone Number
  - + Please select an OCR region. ~1113

[Cancel] [Register]

1101
Preview

PURCHASE ORDER

Company Name: XYZ Corporation ~1106
Address: 1 Pumpkin Road, New York, NY
Phone: (123)456-7890

Total Quantity: 25
Total Price($): 2,150.00

Metadata
- Customer Name
  - + Please select an OCR region. ~1115
- Address
  - XYZ Corporation
  - XYZ Corporation ~1116
- Telephone Number
  - + Please select an OCR region. ~1117

[Cancel] [Register]

1102
Preview

PURCHASE ORDER

Company Name: XYZ Corporation ~1107
Address: 1 Pumpkin Road, New York, NY
Phone: (123)456-7890

Total Quantity: 25
Total Price($): 2,150.00

Metadata
- Customer Name
  - + Please select an OCR region. ~1119
- Address
  - + Please select an OCR region. ~1120
- Telephone Number
  - XYZ Corporation
  - XYZ Corporation ~1121

[Cancel] [Register]

INFORMATION PROCESSING APPARATUS, METHOD, AND STORAGE MEDIUM FOR ASSOCIATING METADATA WITH IMAGE DATA

BACKGROUND

Field

The present disclosure relates to an information processing apparatus, a method, and a storage medium for associating metadata with image data based on a character image contained in the image data.

Description of the Related Art

There are conventional techniques for extracting a character string from a scanned or captured image using optical character recognition (OCR). Japanese Patent Application Laid-Open No. 62-051866 discusses a technique of determining a business form type of a scanned document image and using, as the file name of the document image, the OCR result of a character image in a field identified based on the determined business form type. Furthermore, each of Japanese Patent Application Laid-Open Nos. 2019-041150 and 2012-053911 discusses a technique of displaying a preview of a scanned image and using the OCR result of a user-selected character region as the file name or metadata of the scanned image.

SUMMARY

According to an aspect of the present disclosure, an information processing apparatus includes at least one memory that stores instructions, and at least one processor that executes the instructions to perform displaying a screen including a first pane in which a document image is displayed and a plurality of entry fields in which a plurality of pieces of metadata to be associated with the document image is to be entered, entering, in a case where one of character regions in the document image displayed in the first pane is selected by a user, a character recognition result of the selected character region in an entry field that is identified as an input destination among the plurality of entry fields, and automatically identifying, in a case where the plurality of entry fields includes at least one blank entry field after the entry of the character recognition result in the identified entry field, one of the at least one blank entry field as a next input destination.

An exemplary embodiment of the present disclosure provides a technique for improving operability in entering metadata using character recognition results of character regions selected on a displayed document image.

Further features of the present disclosure will become apparent from the following description of exemplary embodiments with reference to the attached drawings.

BRIEF DESCRIPTION OF THE DRAWINGS

FIG. 4 is a diagram illustrating an example of a setting screen where metadata is not entered.

FIG. 5 is a diagram illustrating an example of a setting screen where metadata is partly entered.

FIGS. 7A and 7B each illustrate an example of a setting screen displayed when a character region on a document image is clicked.

FIG. 9 is a diagram illustrating an example of a setting screen according to a second exemplary embodiment.

FIG. 11 is a diagram illustrating examples of a setting screen according to a third exemplary embodiment.

DESCRIPTION OF THE EMBODIMENTS

Figure 1:
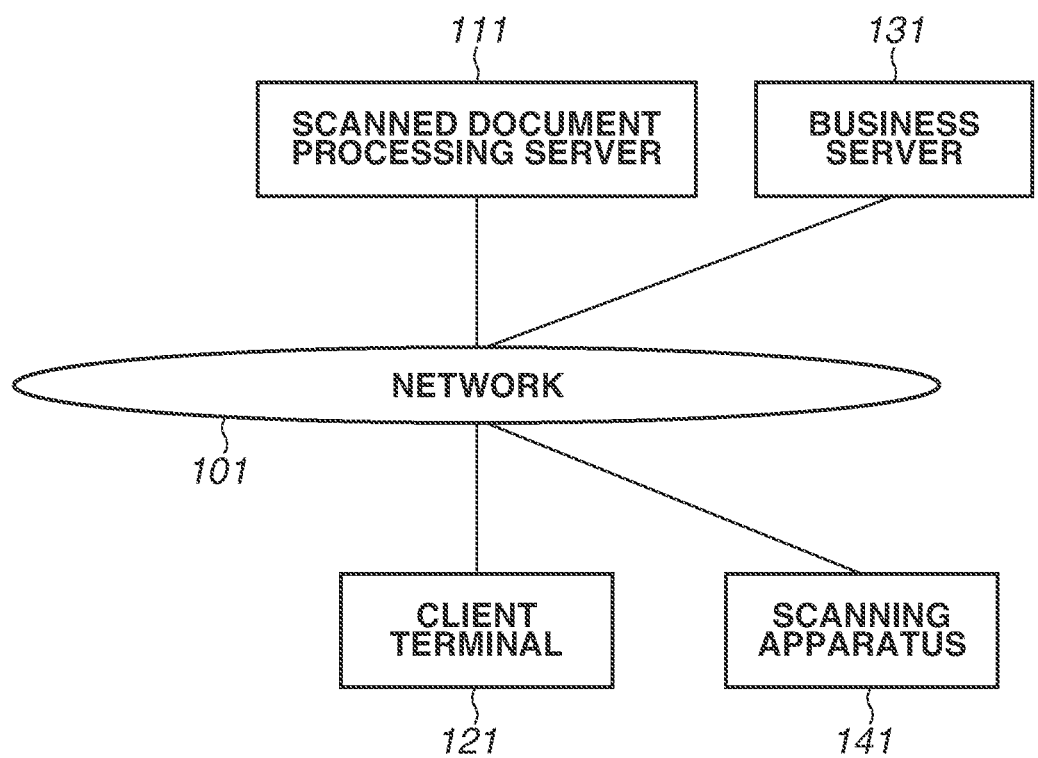
FIG. 1 is a block diagram illustrating an example of a system configuration.

The applicant studies a system that prompts a user to use a mouse pointer to select a plurality of character regions on a document image displayed on the display of a personal computer (PC) and adds (associates) metadata to (with) the document image using the OCR results of the selected plurality of character regions.

In a case where values respectively corresponding to a plurality of types of item names are to be entered as the metadata of the document image, a setting screen as illustrated in FIG. 4 may be used, for example. The setting screen of FIG. 4 includes a preview pane 401 and a metadata pane 411. In the preview pane 401, a document image 402 is displayed. In the metadata pane 411, values are to be entered for a plurality of types of item names as the metadata of the document image 402. For example, in the metadata pane 411, "Customer Name", "Address", and "Telephone Number" are displayed as the predefined item names of the metadata, and the user is to enter pieces of data respectively corresponding to the item names. For example, "XYZ Corporation" in the document image 402 is to be associated with the item name "Customer Name" as the value corresponding thereto. Similarly, "1 Pumpkin Road, New York, N.Y." and "(123)456-7890" are to be associated with the item names "Address" and "Telephone Number", respectively. In this case, the following operation is to be performed. First, the user selects the item name "Customer Name" in the metadata pane 411. Next, the user selects the character region "XYZ Corporation" in the document image 402 displayed in the preview pane 401 as the character region that contains the character string to be associated with the item name. Accordingly, a partial image of the selected character region is displayed in a partial image display field 412 for the item name "Customer Name" in the metadata pane 411, and "XYZ Corporation" is entered in an entry field 413 as the character recognition result of the selected character region. The user further selects "Address" as the item name of the metadata to be added next, and selects the character region "1 Pumpkin Road, New York, N.Y." in the document image 402 displayed in the preview pane 401 as the character region that contains the character string to be associated with the item name. Accordingly, a partial image of the selected character region is displayed in a partial image display field 414 for the item name "Address" in the metadata pane 411, and "1 Pumpkin Road, New York, N.Y." is entered in an entry field 415 as the character recognition result of the selected character region. For the item name "Telephone Number", a similar operation is performed so that a partial image of the selected character region is displayed in a partial image display field 416 and the character recognition result of the selected character region is displayed in an entry field 417. As described above, in a case where the character recognition results of the selected character regions are to be associated with the respective item names of the metadata, the user needs to repeat the operation of selecting a desired item name in the metadata pane 411 and then selecting a desired character region on the document image 402 displayed in the preview pane 401. As the number of item names to be added as metadata increases, the number of times the mouse pointer is moved between the metadata pane 411 and the preview pane 401 to perform selection operations on the metadata pane 411 and on the preview pane 401 increases. Consequently, the operation burden on the user may be increased. In the following embodiments, techniques for improving operability in entering metadata using a character recognition result of a selected character region are disclosed.

FIG. 1 illustrates an example of a system configuration according to a first exemplary embodiment. A network 101 includes a wired or wireless Internet/intranet. A scanned document processing server 111 performs optical character recognition (OCR) processing on a scanned document (document image acquired by scanning) A client terminal 121 is used by a user to check or correct data extracted from the scanned document. A device such as a personal computer, a laptop computer, a tablet computer, or a smartphone can be used as the client terminal 121. A business server 131 is an external system that receives the data extracted from the scanned document and performs various types of processing on the received data. The scanned document is generated by a scanning apparatus 141 (scanner or multifunction peripheral) having a scan function to scan a document. The scanning apparatus 141 can be connected directly to the network 101 to transmit a document image to the scanned document processing server 111 or can be cable-connected to the client terminal 121 to transmit a document image to the scanned document processing server 111 via the client terminal 121.

Figure 2:
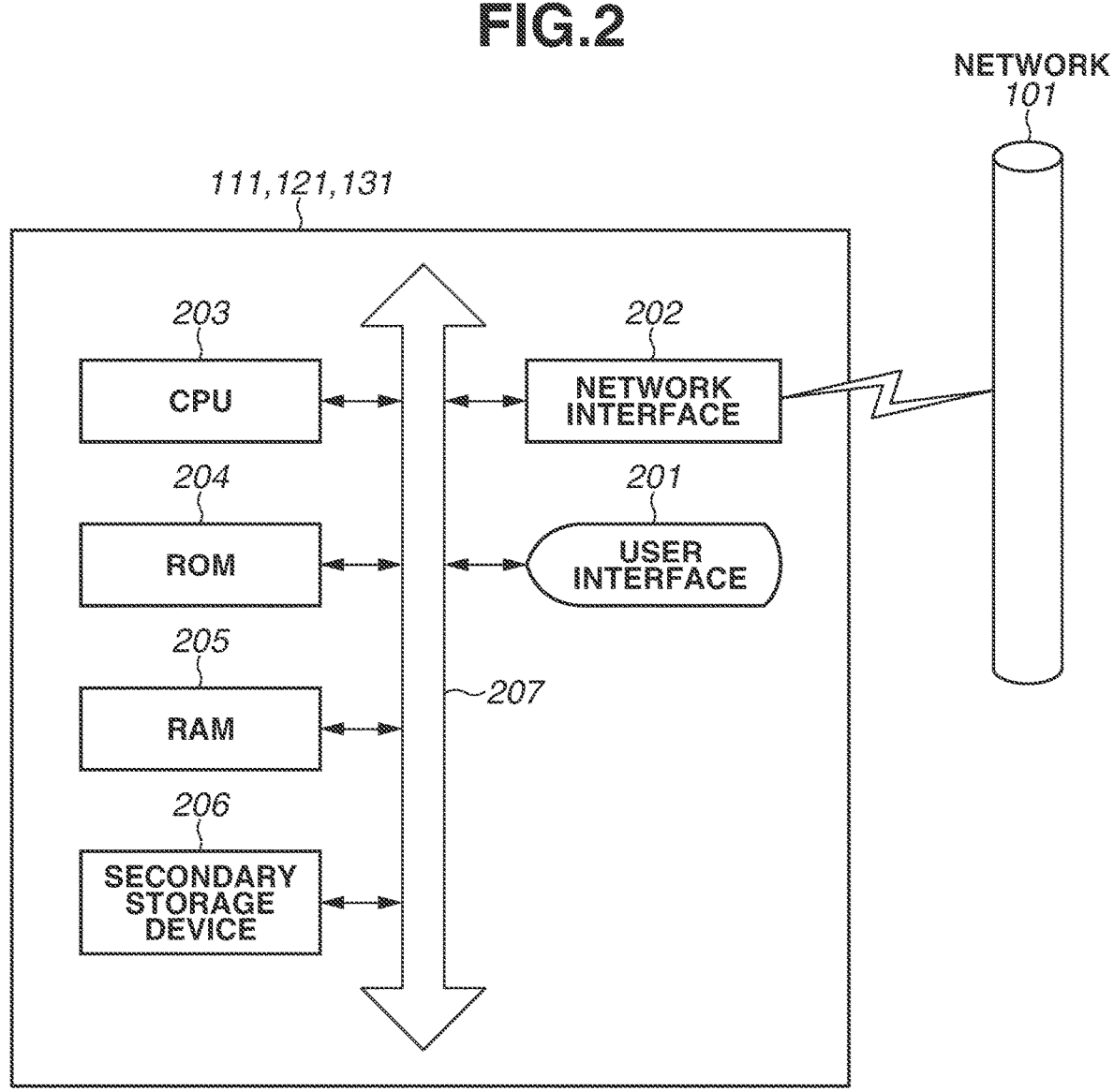
FIG. 2 is a block diagram illustrating an example of a hardware configuration of an information processing apparatus.

FIG. 2 illustrates an example of a hardware configuration of an information processing apparatus that can be used as any one of the scanned document processing server 111, the client terminal 121, and the business server 131. A network interface 202 connects to the network 101, such as a local area network (LAN), to communicate with another computer or a network device. A communication method can be either one of a wired method and a wireless method. A read-only memory (ROM) 204 records embedded programs and data. A random access memory (RAM) 205 is a temporary memory region that can be used as a work area. A secondary storage device 206 is a hard disk drive (HDD) or a flash memory, and stores programs for performing processing (described below) and various types of data. A central processing unit (CPU) 203 executes a program read from the ROM 204, the RAM 205, or the secondary storage device 206 to perform operations described in the following including the flowcharts in FIGS. 6, 8, 10, and 12-13. A user interface 201 includes a display, a keyboard, a mouse, a button, and a touch panel, and receives a users operation and displays information. The above-described processing units are connected together via an input/output interface 207.

Figure 3:
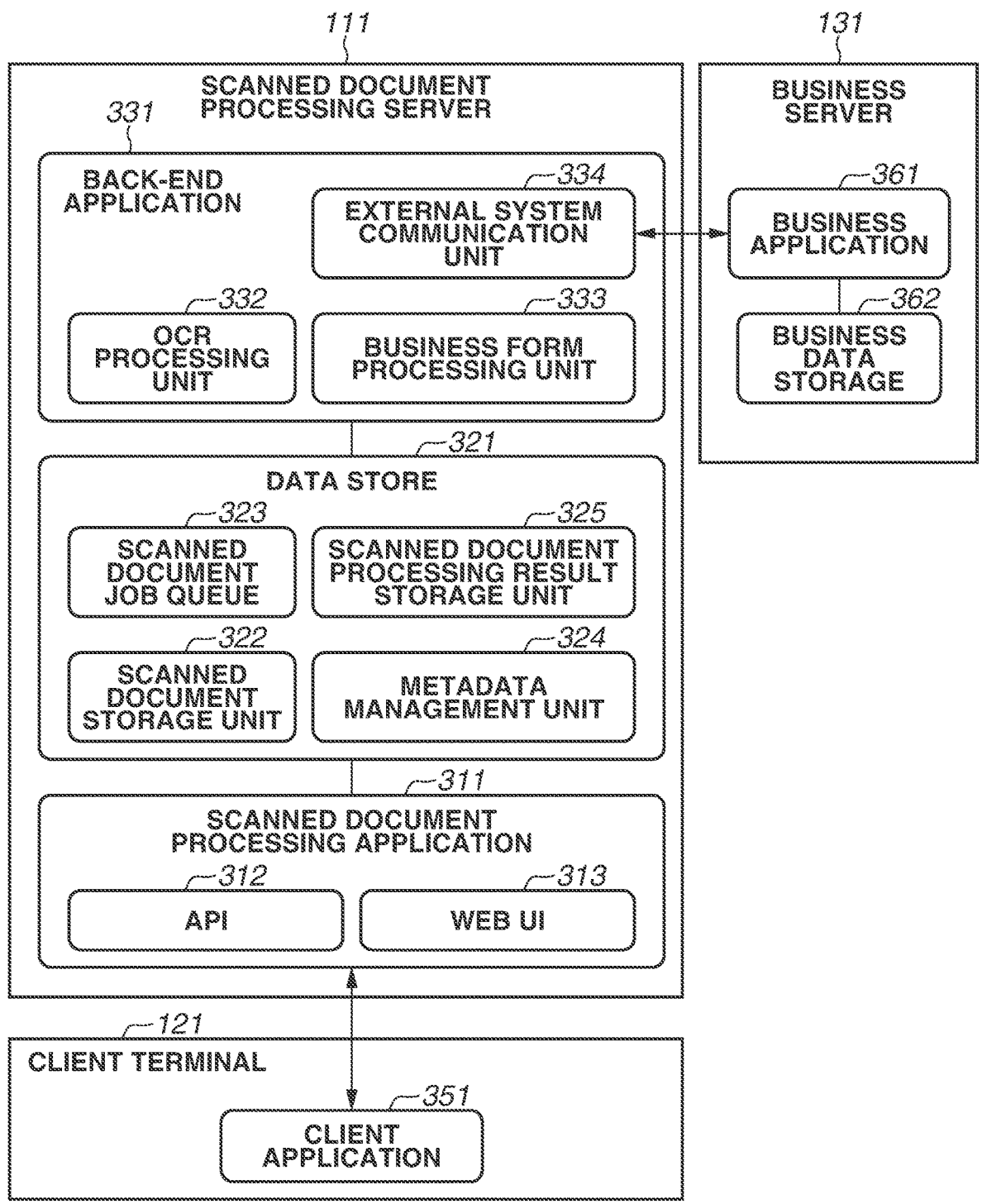
FIG. 3 is a block diagram illustrating an example of a software configuration.

FIG. 3 illustrates a configuration of software (program) that is executed by each of the scanned document processing server 111, the client terminal 121, and the business server 131 according to the present exemplary embodiment. The software installed therein is executed by the CPU 203 of each of the apparatuses, and the apparatuses can communicate with each other.

A scanned document processing application 311 is a program installed in the scanned document processing server 111. While in the present exemplary embodiment, the scanned document processing server 111 executes the scanned document processing application 311 to operate as a web application server, the present exemplary embodiment is not limited thereto. An application programming interface (API) 312 is provided by the scanned document processing application 311. A web user interface (web UI) 313 is provided by the scanned document processing application 311.

A data store 321 is a module that stores and manages data to be used by the scanned document processing application 311 and a back-end application 331 (described below). The data store 321 stores various types of data to be described next. A scanned document storage unit 322 stores a scanned document image as a Joint Photographic Experts Group (JPEG) image file or a standardized document file. A scanned document job queue 323 holds a queue that manages a job waiting for metadata input processing (described below). A metadata management unit 324 manages, for each scanned document, a list of a plurality of pieces of metadata to be added, the name of each piece of metadata (i.e., the item name of each of the plurality of pieces of metadata), and a value format (such as a character string or a number). A scanned document processing result storage unit 325 stores OCR processing results and business form determination results. Furthermore, the scanned document processing result storage unit 325 stores, for each scanned document, associated metadata, information about the regions from which the metadata is extracted, and edited metadata values The back-end application 331 is a program for performing background processing. The back-end application 331 is in charge of processes that can be performed sequentially in the background as described next. An OCR processing unit 332 acquires a document image from the scanned document storage unit 322 and performs OCR processing on the acquired document image. In the OCR processing, the coordinates of the start point of a region recognized as a character string, the width and height of the region, and the OCR result character string of the region are extracted. A business form processing unit 333 determines the type of business form using the arrangement pattern of regions identified by region analysis on an input image, information about the character strings of the OCR processing results, and the two-dimensional code detected from the input image. In business form type determination processing, any method such as pattern recognition or machine learning can be used. An external system communication unit 334 transmits a scanned document and the OCR results of the scanned document to the business server 131 that is an external system. In a case where the scanned document or the processing results are not to be transmitted to an external system (e.g., a case where the processing results are stored in the scanned document processing server 111 or the client terminal 121), the external system communication unit 334 can be omitted.

A client application 351 is a program executed on the client terminal 121. In the present exemplary embodiment, the client application 351 is provided as a web application of the scanned document processing application 311. More specifically, the client application 351 is implemented by a method in which a web browser of the client terminal 121 displays the web UI 313 and necessary data is transmitted and received via the API 312, but the method is not limited thereto. For example, the client application 351 can be an application configured to transmit and receive necessary data via the API 312 and running on a computer desktop, or can be a mobile application configured to transmit and receive necessary data via the API 312 and running on a smartphone.

A business application 361 is a program executed on the business server 131. A business data storage 362 is a module that stores data to be used by the business application 361. The business application 361 receives the processing results (metadata and document image) from the scanned document processing server 111 to perform processing relating to various types of businesses, such as file management, document management, order management, and accounting processing. The business types are not limited thereto.

Figure 6:
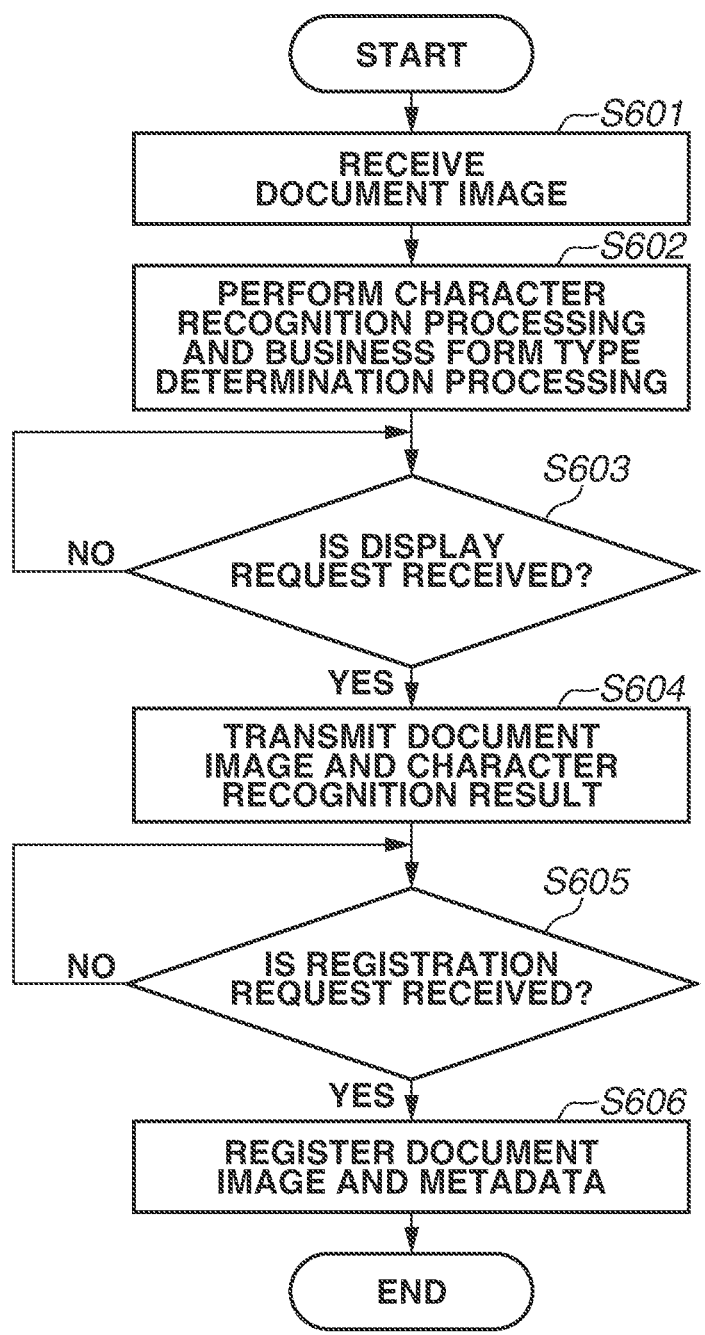
FIG. 6 is a flowchart illustrating processing performed by a scanned document processing server.

Next, processing performed by the scanned document processing server 111 will be described with reference to FIG. 6.

In step S601, the scanned document processing server 111 receives a scanned document (i.e., document image) generated by the scanning apparatus 141 performing scanning, and stores the received document in the scanned document storage unit 322.

In step S602, the scanned document processing server 111 performs character recognition processing and business form type determination processing (business form recognition processing) using the OCR processing unit 332 and the business form processing unit 333, respectively. The character strings of the character recognition results, the position information of each character region, and the business form type determination result are stored in the scanned document processing result storage unit 325. In a case where the business form type is determined in the business form type determination processing, the item names of metadata to be added to the determined business form type are also identified. As described above, the business form type is determined using the arrangement pattern of regions identified by region analysis on the scanned document, the information about the character strings of the character recognition results, and the two-dimensional code detected from the scanned document.

A trained model may be generated by learning of the position information of each character region used in adding metadata to the scanned document, and learning of the layout of the document. With the trained model generated, in a case where another document of the same business form type having a similar layout is scanned, the positions of the character regions to be used as the metadata are identified based on the trained model, so that the metadata can be automatically added to the scanned document using the character recognition results of the character regions. In this case, the user checks whether the automatically added metadata is correct on the client terminal 121, corrects the metadata as needed, and then issues a registration instruction to the business server 131 (external system).

Meanwhile, even if the business form type has been determined by recognition of the title of the document in the character recognition processing, in a case where a document having a similar layout has not been learned or in a case where part of the character regions has not been successfully identified, it is not possible to add metadata automatically. In this case, the user performs an input operation with respect to the metadata that has not been automatically added, and then issues a registration instruction to the business server 131 (external system).

In step S603, the scanned document processing server 111 determines whether a scanned document display request is received from the client terminal 121. In a case where the scanned document processing server 111 determines that the display request is received (YES in step S603), then in step S604, a preview image of the requested scanned document, the character recognition results (the position information of each character region and the information about the character string recognized in the character region), and the item names of the metadata corresponding to the business form type are transmitted to the client terminal 121. At this time, in a case where at least part of the metadata has automatically been added based on the trained model, information about the automatically added metadata is also transmitted.

An overview of an operation of a screen user interface (UI) that is displayed by execution of the client application 351 on the client terminal 121 will be described with reference to FIG. 4. In a case where the client application 351 is a web application, the screen UI is displayed on the web browser. The preview pane 401 displays a preview of the scanned document image (page image) 402. In the preview pane 401, the user can display a desired portion of the document image 402 by scrolling or zooming the document image 402. The metadata pane 411 contains the plurality of entry fields (entry graphical user interface (GUI) components) 413, 415, and 417 (which are also referred to as entry controls) for entering the values to be set as the metadata of the document image 402 previewed in the preview pane 401. The plurality of item names of the metadata is determined based on the business form type of the scanned document image. For example, in a case where the business form type of the document image 402 is determined as "purchase order", and "Customer Name", "Address", and "Telephone Number" are defined as the item names of the metadata to be added to (associated with) the purchase order, a setting screen containing the metadata pane 411 as illustrated in FIG. 4 is displayed. The metadata pane 411 contains the entry fields 413, 415, and 417 for entering metadata relating to the corresponding item names. The metadata pane 411 also contains the partial image display fields 412, 414, and 416 each for displaying the partial image of the character region from which the character recognition result is extracted in a case where the metadata is entered using the character recognition result. In a case where the metadata has automatically been added based on a similar business form, the automatically added metadata is displayed in the entry fields 413, 415, and 417, whereas in a case where the metadata has not automatically been added, the entry fields 413, 415, and 417 are blank as illustrated in FIG. 4. In this case, when the user selects a desired item name as the input destination and then selects a desired character region in the document image 402, the partial image of the selected character region is displayed in the partial image display field for the item name selected as the input destination. Then, the character recognition result corresponding to the partial image of the selected character region is entered in the entry field for the item name selected as the input destination. The user can also key in a character string or correct the character string in the entry field by using the keyboard of the client terminal 121.

A Cartesian coordinate system on the document image 402 will be described with reference to an image 421 illustrated in FIG. 4. The image 421 schematically illustrates the upper end portion of the document image 402. The upper left corner of the document image (page image) 402 is defined as the origin of the page image 402. The OCR processing unit 332 performs OCR processing on the page image 402 and acquires the coordinates of the start point of each of character regions 422, 423, and 424 recognized as character strings (i.e., the coordinates of the upper left of each of the character regions 422, 423, and 424) and the width and height of each of the character regions 422, 423, and 424. The OCR processing unit 332 acquires, from the image 421 of FIG. 4, information about the shaded character regions 422, 423, and 424. The acquired character region information is internally held, and if the user clicks the mouse on a position in the document image 402, the character region that corresponds to the clicked position is set to a selected state. The document image 402 includes the other character regions, but description thereof is omitted here. For example, in the case of the character region 424, the coordinates of the start point are expressed as (1200, 700), and the width and height are expressed as 720 and 120, respectively.

FIG. 5 illustrates an example of a screen where metadata is automatically added for an item name "Customer Name" 512 based on a similar business form, but metadata is not added for the other item names. In this case, for the item name "Customer Name" 512 in a metadata pane 511, the partial image of the character region used in automatically adding the metadata is cut out and displayed in a partial image display field 513, and the automatically added metadata (i.e., the character recognition result of the character region) is also entered and displayed in an entry field 514. For the item names for which no metadata is set, a "+" button indicating that no partial image is set is displayed as in a partial image display field 515, and an entry field 516 is displayed as a blank field. Similarly to the case of FIG. 4, for the item names for which no metadata is set, the user is to set metadata for each of the item names by selecting a desired character region in the document image or by keying in a character string using the keyboard.

In a case where the user issues a registration instruction after checking or correcting the metadata to be added to the scanned document on the client terminal 121, the client terminal 121 transmits the registration request to the scanned document processing server 111. At this time, the registration request contains information about the metadata set via the screen of FIG. 4 or 5. In step S605, the scanned document processing server 111 receives the registration request from the client terminal 121, and the processing proceeds to step S606. In step S606, the document image and the metadata are registered in the business server 131 (external system).

A metadata setting screen displayed by the client application 351 of the client terminal 121 will be described with reference to a flowchart illustrated in FIG. 8. The scanned document processing application 311 of the scanned document processing server 111 acquires, from the scanned document job queue 323, a queue that relates to a list of scanned document jobs waiting for processing, and provides the acquired queue to the client application 351. If the user of the client terminal 121 selects a desired scanned document job as the processing target from the provided list of scanned document jobs waiting for processing, the client application 351 transmits a request to display the selected job to the scanned document processing server 111. When the scanned document processing application 311 receives the display request in step S603 described above, the scanned document processing application 311 acquires, from the scanned document storage unit 322, the preview image of the requested scanned document. The scanned document processing application 311 also acquires, from the scanned document processing result storage unit 325, the character recognition results (the position information of each character region and the information about the character string recognized in the character region) of the requested scanned document. The scanned document processing application 311 further acquires, from the metadata management unit 324, a list of the item names of the metadata corresponding to the business form type of the requested scanned document and acquires, in a case where at least part of the metadata has automatically been added, the information about the automatically added metadata. Then, the scanned document processing application 311 provides these pieces of data to the client application 351. In step S801, the client application 351 receives the preview image, the character recognition results, the item names of the metadata, and the information about the automatically added metadata, which are provided by the scanned document processing application 311.

In step S802, the client application 351 displays the preview image in the preview pane and displays the item names of the metadata and the information about the automatically added metadata in the metadata pane, based on the data received in step S801. In step S803, the client application 351 sets a variable number n to 1.

In step S804, the client application 351 determines whether data has been entered in the entry field (entry control) for the nth item name of the metadata. In a case where the client application 351 determines that data has been entered (YES in step S804), the processing proceeds to step S805. In step S805, the variable number n is incremented by one. Then in step S806, in a case where the client application 351 determines that data has not been entered for all the item names (NO in step S806), the processing returns to step S804. In step S804, the client application 351 determines whether data has been entered for the next item name.

In a case where the client application 351 determines that data has not been entered in the entry field for the nth item name (NO in step S804), the processing proceeds to step S808. In step S808, a cursor is placed on the entry field (entry control) for the nth item name to identify the nth item name as the input destination. For example, in FIG. 4, data has not been entered for any of the item names. The cursor is thus displayed on the entry field 413 for the first item name ("Customer Name") to identify the first item name as the current input destination. At this time, the region of the first item name may be highlighted with a thick-line frame in order to make it clear that the first item name is being selected as the input destination. For example, in FIG. 5, data has been entered in the entry field 514 for the first item name ("Customer Name"). The cursor is thus displayed on the entry field 516 for the second item name ("Address").

In step S809, the client application 351 determines whether a character region in the preview image displayed in a preview pane 501 is clicked by the user (i.e., whether a character region in the preview image is selected by the user).

In a case where the client application 351 determines that a character region in the preview image is selected (YES in step S809), then in step S810, the character recognition result of the selected character region is entered in the entry field on which the cursor is placed (i.e., the entry field for the item name being selected). After the character recognition result has been entered in the entry field, the processing proceeds to step S808 through steps S805, S806, and S804, so that the cursor is automatically moved to the next blank entry field. More specifically, when the user simply selects a desired character region in the preview image displayed in the preview pane, one of the blank entry fields in the metadata pane is automatically identified as the next input destination, and the cursor is automatically moved to the identified blank entry field. Therefore, the user can sequentially enter data for the item names in the metadata pane by simply performing a click operation in the preview pane. This can save the user from having to move the mouse pointer. For example, while the cursor is placed on the entry field 516 as illustrated in FIG. 5, if the user clicks the character string "1 Pumpkin Road, New York, N.Y." in the preview image displayed in a preview pane 700 (see FIG. 7A), a character region 702 at the clicked position is selected and shaded (or color-displayed) as illustrated in FIG. 7A, and the character recognition result of the selected character region 702 is entered in an entry field 712 in a metadata pane 710. At this time, each of a character region 701 and the character region 702 that are used to enter data for the corresponding item names is displayed with a different type of shading (or color). Then, at the left side of each of the item names in the metadata pane 710, a legend indicating the type of shading (or color) of the character region is displayed, so that the user can easily identify the position of the character region from which the data of the character string associated with the item name is extracted.

Figure 7B:
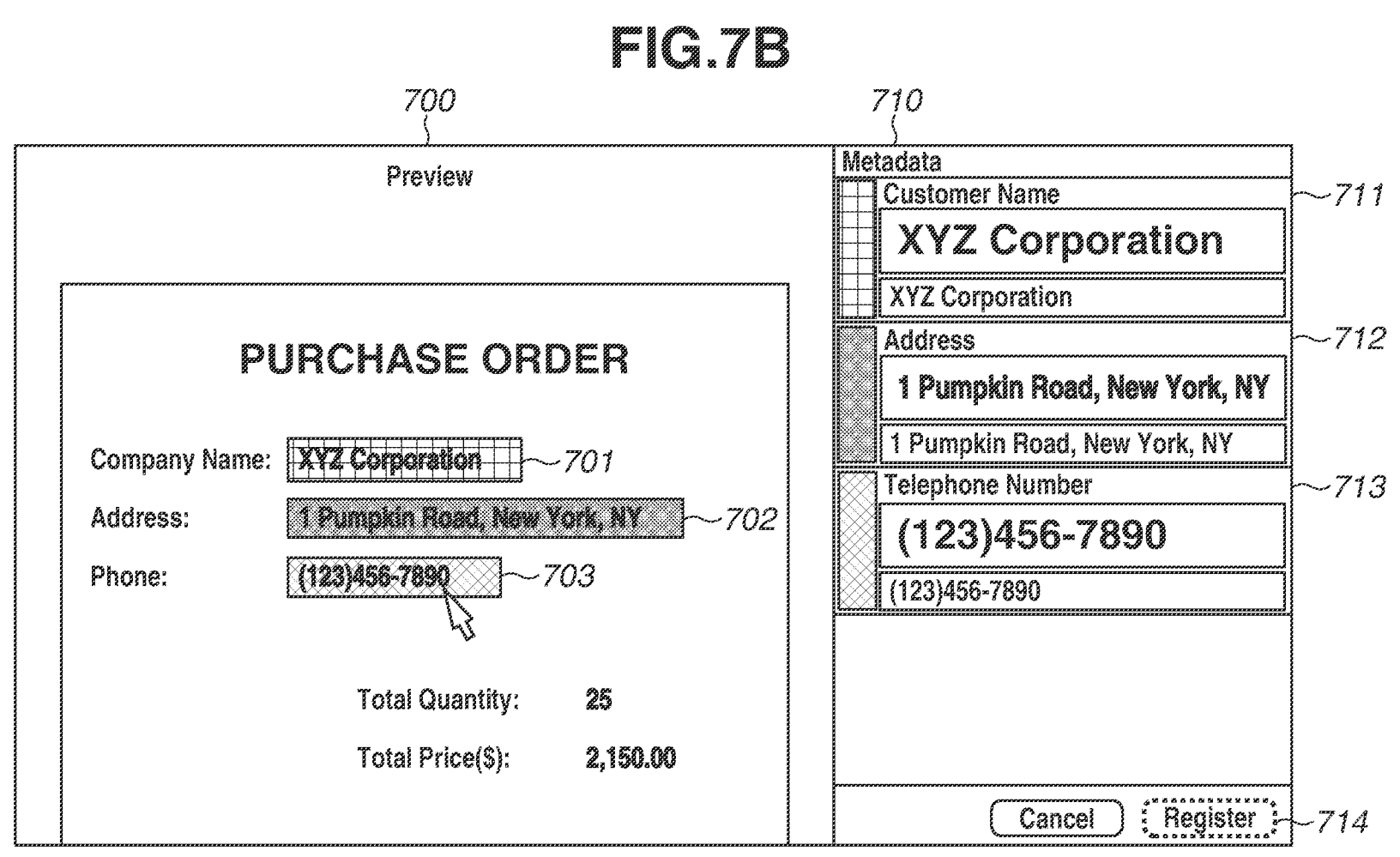

Furthermore, in a case where data has been entered in the entry fields for all the item names as a result of entering the character recognition result of the selected character region in the selected entry field, the processing proceeds to steps S805, S806, and S807 in this order, so that the focus is on a Register button 714. For example, in a state where the cursor has been moved to an entry field 713 as illustrated in FIG. 7A, if the user selects a character region 703 (see FIG. 7B) in the preview image, the character string corresponding to the entry field 713 is entered as illustrated in FIG. 7B. In FIG. 7B, data has been entered in all entry fields including an entry field 711 and the entry fields 712 and 713 in the metadata pane 710, so that the focus is on the Register button 714. If the user presses an Enter key of the keyboard with the focus on the Register button 714, the registration processing of step S816 (described below) is performed.

In step S811, the client application 351 determines whether a character string is keyed in via the keyboard by the user. In a case where the client application 351 determines that a character string is keyed in via the keyboard (YES in step S811), the processing proceeds to step S812. In step S812, the client application 351 enters the keyed-in character string in the entry field on which the cursor is placed. As described above, in a case where there is no desired character string in the preview image, the user can key in a character string by simply operating the keyboard. In a case where the user keys in a character string, the processing proceeds to step S808 through steps S805, S806, and S804, so that the cursor is automatically moved to the next blank entry field.

In step S813, the client application 351 determines whether another item name, which is different from the currently selected item name (i.e., the item name on which the cursor is currently placed), is selected by the user. In a case where the client application 351 determines that another item name is selected (YES in step S813), the processing proceeds to step S814.

In step S814, the client application 351 places the cursor on the entry field for the user-selected item name, and the processing returns to step S809 and the subsequent steps.

In step S815, the client application 351 determines whether a registration instruction or a cancellation instruction is issued. In a case where the client application 351 determines that a registration instruction is issued (YES in step S815), then in step S816, the client application 351 transmits a registration request together with the data entered in the entry fields 711, 712, and 713 in the metadata pane 710. A registration instruction is executed in a case where the Enter key of the keyboard is pressed with the focus on the Register button 714 or in a case where the Register button 714 is clicked by a mouse operation. On the other hand, in a case where the client application 351 determines that a cancellation instruction is issued (NO in step S815), then in step S817, the client application 351 discards the data entered on the setting screen of FIG. 7B and returns to a screen (not illustrated) that displays the list of scanned document jobs waiting for processing.

According to the first exemplary embodiment, when the user simply selects a desired character region on the preview image displayed in the preview pane, the character recognition result of the selected character region is entered in the corresponding entry field in the metadata pane, and the cursor is automatically moved to a blank entry field. This allows the user to reduce the frequency of moving the mouser pointer between the preview pane and the metadata pane, thereby improving operability.

Figure 8:
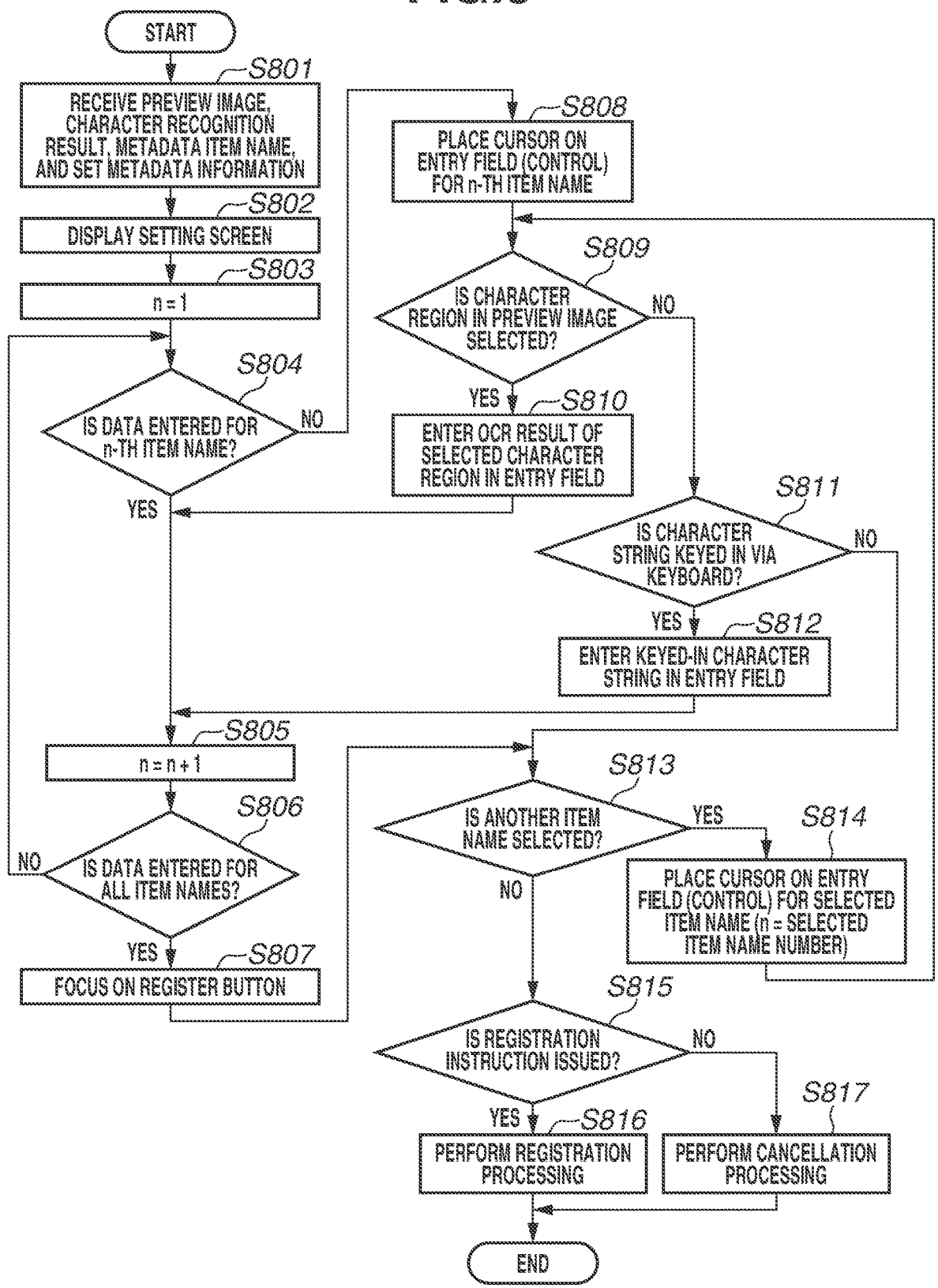
FIG. 8 is a flowchart illustrating processing performed by a client terminal according to a first exemplary embodiment.

In the first exemplary embodiment, in a case where a character region is selected by the user in step S809 of FIG. 8, the character recognition result of the selected character region is entered in the entry field in step S810, and then the processing proceeds to step S808 through steps S805, S806, and S804, so that the cursor is automatically moved to the entry field for the next item name. In a second exemplary embodiment, in a case where a character region in the preview image is selected by the user, if the accuracy (or reliability) of the character recognition result of the selected character region is low, the cursor is not to be moved to the entry field for the next item name, so that the user can easily correct the entered character recognition result.

A metadata setting screen that is displayed by the client application 351 of the client terminal 121 according to the second exemplary embodiment will be described with reference to a flowchart illustrated in FIG. 10 and a screen example illustrated in FIG. 9. Steps in the flowchart of FIG. 10 similar to those of FIG. 8 are given the same reference numerals, and detailed description thereof is omitted.

Figure 10:
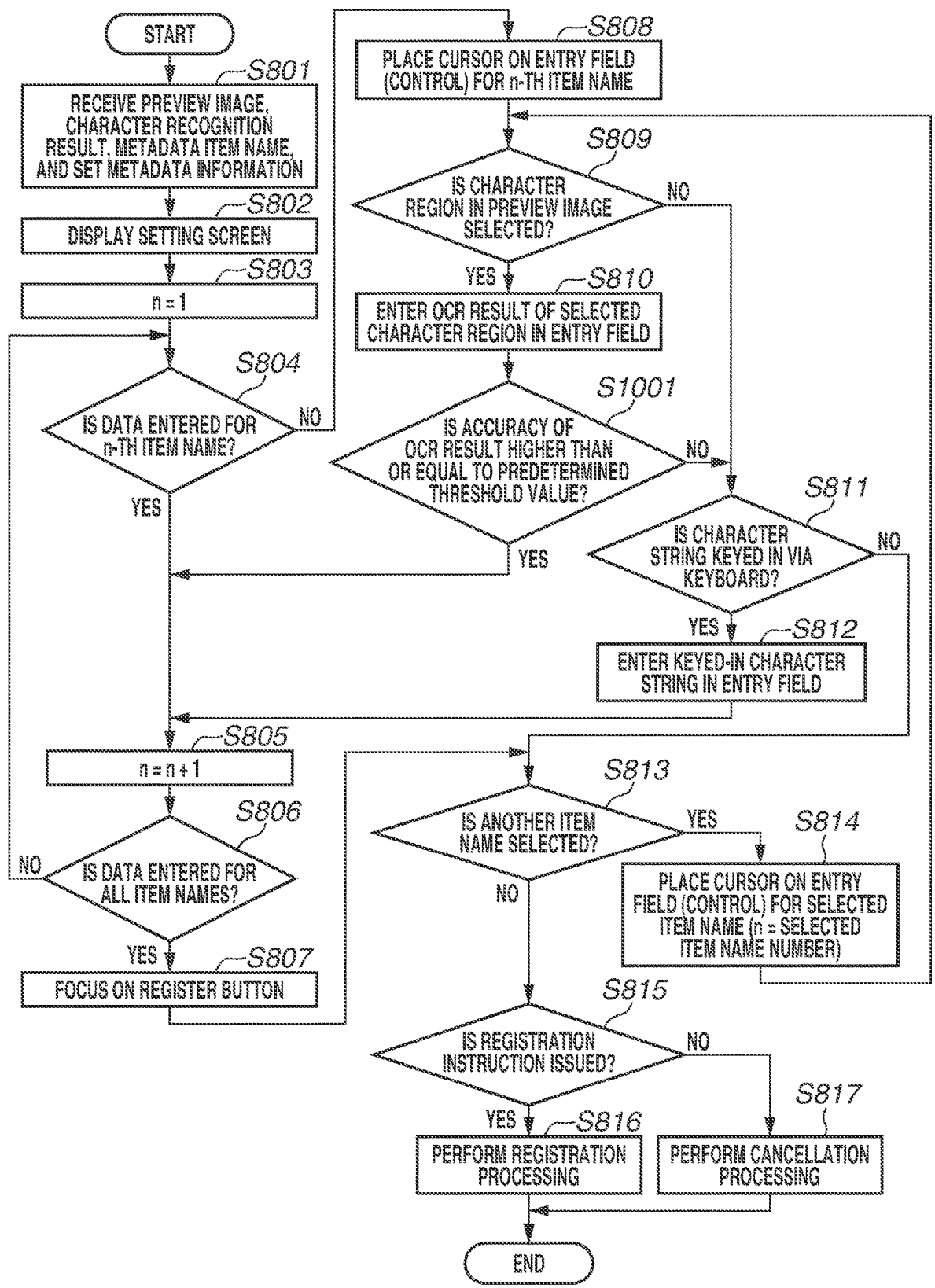
FIG. 10 is a flowchart illustrating processing performed by a client terminal according to the second exemplary embodiment.

In step S809 of FIG. 10, in a case where the client application 351 determines that a character region in the preview image is clicked by the user, then in step S810, the character recognition result of the selected character region is entered in the entry field on which the cursor is currently placed. Then in step S1001 of FIG. 10, the client application 351 determines whether the accuracy (or reliability) of the entered character recognition result is higher than or equal to a predetermined threshold value. In step S1001, in a case where the client application 351 determines that the accuracy of the character recognition result is higher than or equal to the predetermined threshold value (YES in step S1001), the processing proceeds to steps S805, S806, S804, and S808 in this order, so that the cursor is automatically moved to the next blank entry field, similarly to the first exemplary embodiment. On the other hand, in step S1001, in a case where the client application 351 determines that the accuracy of the character recognition result is lower than the predetermined threshold value (NO in step S1001), the cursor is not to be moved to another entry field, and the processing proceeds to step S811. In step S811, whether correction processing is performed using the keyboard is determined.

For example, while the cursor is placed on the entry field 516 as illustrated in FIG. 5, if a character region 902 (see FIG. 9) in the preview image displayed in a preview pane 900 is selected as illustrated in FIG. 9, the character recognition result of the selected character region 902 is entered in the corresponding entry field in a metadata pane 910. At this time, in a case where the character string of the character recognition result contains an erroneously recognized character, the accuracy (reliability) of the character recognition result is low, and a cursor 912 thus remains in the entry field without being moved. At this time, the entire entered character string is set to a selected state as illustrated in FIG. 9. In this state, if the user keys in a character string directly via the keyboard, the user can replace the entire entered character string by the keyed-in characters, or the user can correct only part of the characters by pressing an arrow key of the keyboard. In a case where the accuracy of the character recognition result is lower than the predetermined threshold value, a message indicating that the character recognition result may contain an erroneous character can be additionally displayed to call attention to the user.

According to the second exemplary embodiment, in a case where the character recognition result may contain an erroneously recognized character, the cursor is not to be automatically moved to the entry field for the next item name, thereby preventing the user from adding metadata to the scanned document without noticing the erroneously recognized character.

In a third exemplary embodiment, in a case where the user clicks a character region in the preview image, but the entry field identified as the input destination of the character recognition result of the character region is different from that intended by the user, the user can easily change the input destination by operating a wheel of the mouse.

A metadata setting screen that is displayed by the client application 351 of the client terminal 121 according to the third exemplary embodiment will be described with reference to a flowchart illustrated in FIG. 12 and a screen example illustrated in FIG. 11. Steps in the flowchart of FIG. 12 similar to those of FIG. 8 are given the same reference numerals, and detailed description thereof is omitted.

Figure 12:
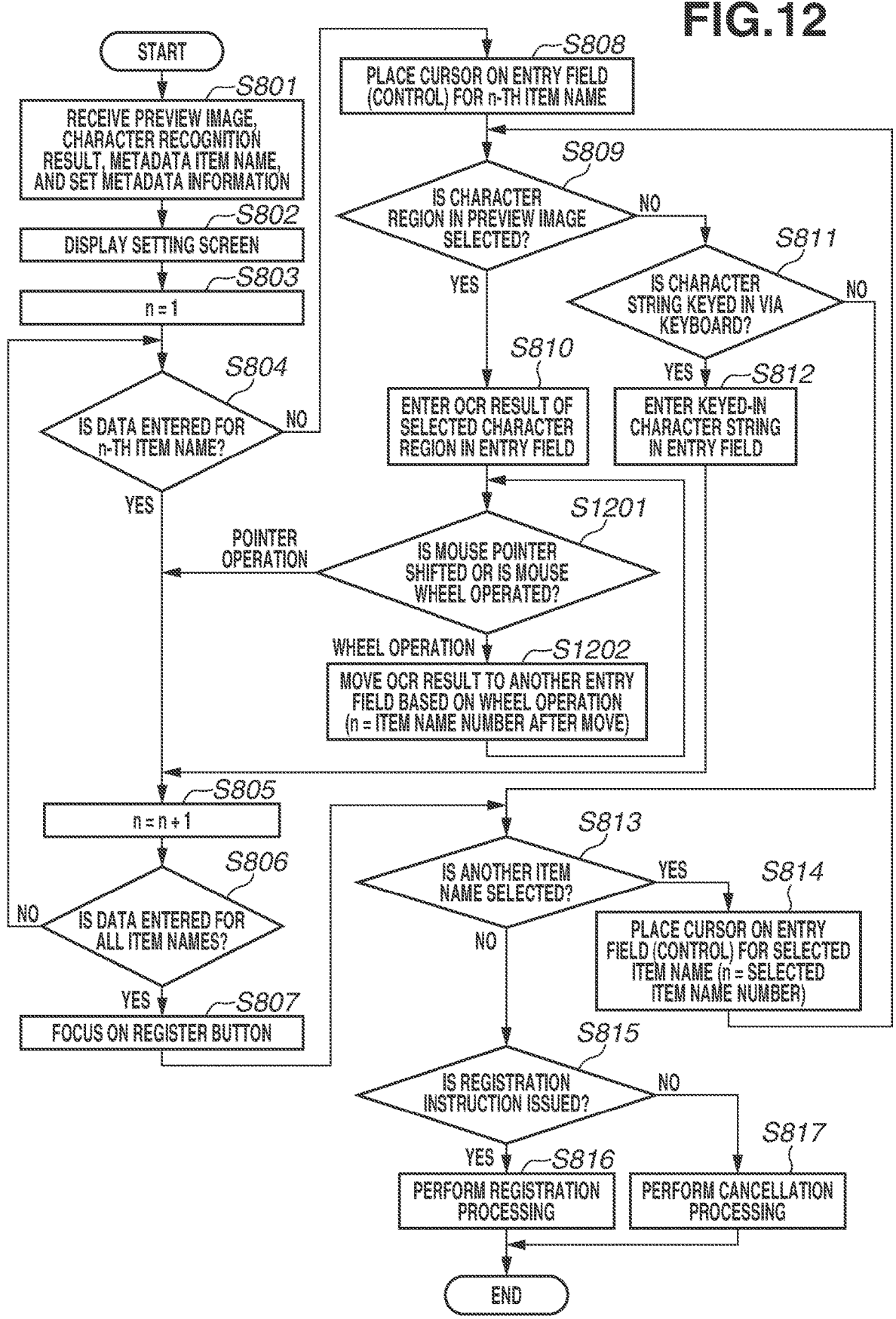
FIG. 12 is a flowchart illustrating processing performed by a client terminal according to the third exemplary embodiment.

In step S809 of FIG. 12, in a case where the client application 351 determines that a character region in the preview image is clicked by the user (YES in step S809), then in step S810, the character recognition result of the selected character region is entered in the entry field on which the cursor is currently placed. Then in step S1201 of FIG. 12, whether the position of the mouse pointer is shifted from the range of the clicked (selected) character region or the mouse wheel is operated.

In a case where it is determined that the mouse pointer is moved and shifted from the selected character region in step S1201 (POINTER OPERATION in step S1201), the character string of the character recognition result entered in the entry field is fixed, and the processing proceeds to step S805. Then, in a case where there is a blank entry field, the processing proceeds to step S808 through steps S806 and S804, so that the cursor is automatically moved to the next blank entry field.

On the other hand, in step S1201, in a case where it is determined that the mouse wheel is operated while the mouse pointer remains in the character region clicked with the mouse pointer (WHEEL OPERATION in step S1201), the processing proceeds to step S1202. In step S1202, in a case where the mouse wheel is operated downward, the character string of the character recognition result that is entered in the entry field for the nth item name is moved to the entry field for the next item name ((n+1)th item name) under the nth item name, and the variable number n is updated to n+1. In a case where the mouse wheel is further operated downward, the character string of the character recognition result is moved to the entry field for the next item name under the (n+1)th item name, and the variable number n is updated. On the other hand, in a case where the mouse wheel is operated upward, the character string of the character recognition result that is entered in the entry field for the nth item name is moved to the entry field for the next item name ((n−1)th item name) over the nth item name, and the variable number n is updated to n−1. In the present exemplary embodiment, in a case where the mouse wheel is operated to move the character string of the character recognition result to the entry field for the bottommost (last) item name and then is further operated downward, the character string is moved to the entry field for the uppermost (first) item name. On the other hand, in a case where the character string is moved to the entry field for the uppermost (first) item name and then the mouse wheel is further operated upward, the character string is moved to the entry field for the bottommost (last) item name. As described above, in the third exemplary embodiment, the character string is moved "in a loop" based on the wheel operation, but the present exemplary embodiment is not limited thereto. More specifically, even in a case where the character string is moved to the entry field for the last item name and then the wheel is further operated downward, the character string may remain in the last entry field without being moved to the first entry field. Furthermore, even in a case where the character string is moved to the entry field for the first item name and then the wheel is further operated upward, the character string may remain in the first entry field without being moved to the last entry field.

In the third exemplary embodiment, the character string entered in an entry field in response to the user clicking a character region on the preview image can be moved based on a direction in which the mouse wheel is operated. Thus, in a case where the character string of the character region clicked by the user is supposed to have been entered in another entry field, the user can easily move the character string by operating the mouse wheel.

The processing of determining "whether the accuracy of the character recognition result is higher than or equal to the predetermined threshold value", which has been described in the second exemplary embodiment, can be added to the flowchart of FIG. 12 according to the third exemplary embodiment. In this case, in step S1201 of FIG. 12, in a case where it is determined that the position of the mouse pointer is shifted from the selected character region, the determination processing of step S1001 of FIG. 10 is then performed. In this way, in a case where the position of the mouse pointer is shifted from the selected character region, if the accuracy of the character recognition result is higher than or equal to the predetermined threshold value, the cursor is to be automatically moved to a blank entry field. On the other hand, if the accuracy of the character recognition result is lower than the predetermined threshold value, the cursor is to remain in the entry field for the selected item name.

In the third exemplary embodiment described above, in a case where the mouse wheel is operated immediately after a character region is selected in the preview image, the character recognition result of the selected character region is moved to another entry field based on the wheel operation.

Figure 13:
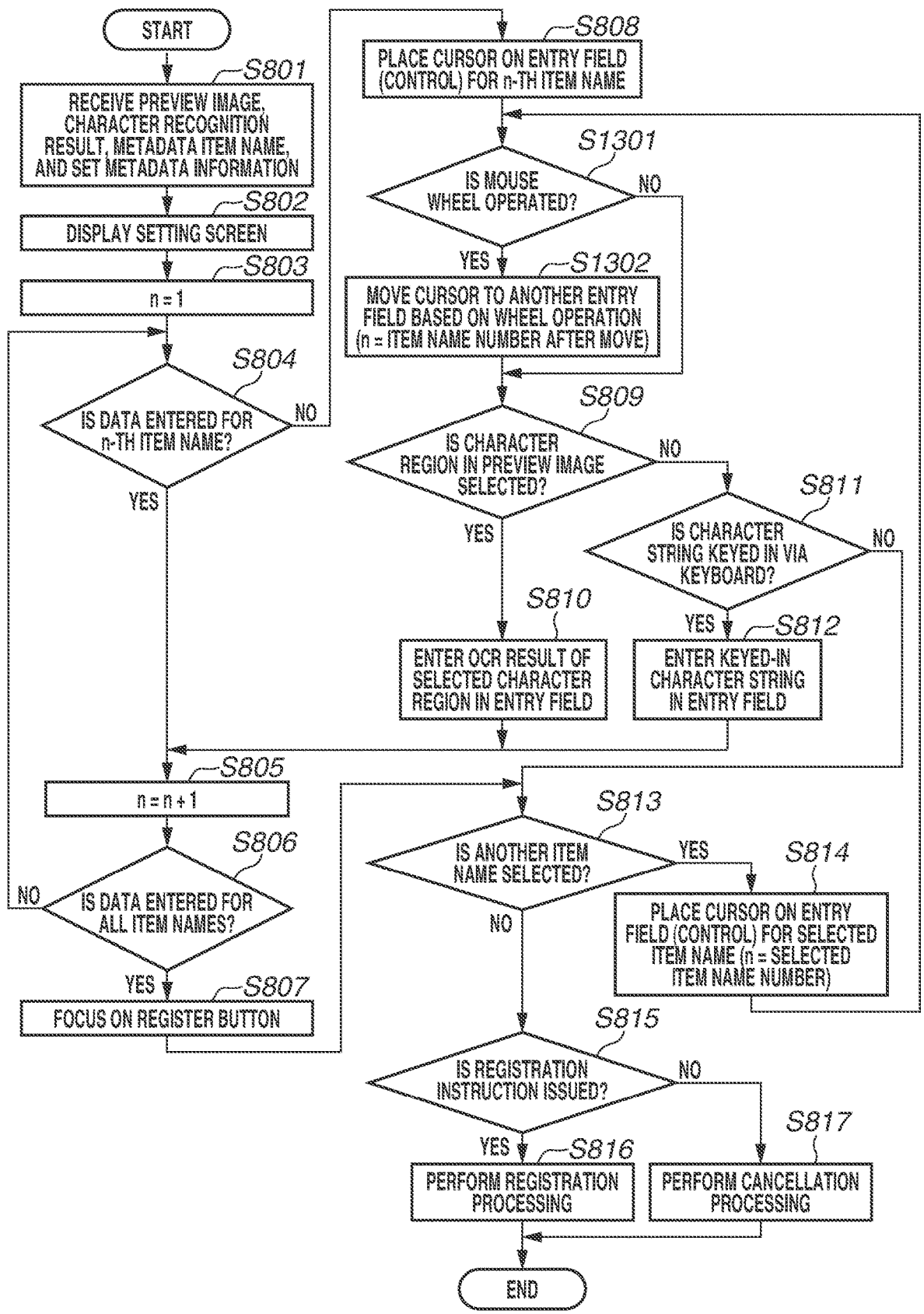
FIG. 13 is a flowchart illustrating processing performed by a client terminal according to a fourth exemplary embodiment.

In a fourth exemplary embodiment, an example in which, if the mouse wheel is operated before selection of a character region in the preview image, another entry field is identified as the input destination based on the wheel operation will be described with reference to a flowchart illustrated in FIG. 13. Steps in the flowchart of FIG. 13 similar to those of FIG. 8 are given the same reference numerals, and detailed description thereof is omitted. FIG. 13 includes steps S1301 and S1302 between steps S808 and S809.

In step S1301, whether the mouse wheel is operated is determined. In a case where it is determined that the wheel is operated (YES in step S1301), the processing proceeds to step S1302. On the other hand, in a case where it is determined that the wheel is not operated (NO in step S1301), the processing proceeds to step S809.

In step S1302, the cursor displayed on the entry field that is the current input destination is moved in response to the operation direction of the mouse wheel, so that another entry field is identified as the input destination. More specifically, in a case where the wheel is operated downward, the cursor displayed on the entry field for the item name identified as the current input destination is moved sequentially to the entry fields for the item names below the identified item name. In addition, in a case where the wheel is operated upward, the cursor displayed on the entry field for the item name identified as the current input destination is moved sequentially to the entry fields for the item names above the identified item name.

With the above-described configuration, even in a case where the mouse pointer is on the preview pane, the user can easily change the input destination from the currently identified entry field to another entry field by operating the mouse wheel.

While in the present exemplary embodiment, the case where the processing in steps S1301 and S1302 is included in the flowchart of FIG. 8 according to the first exemplary embodiment has been described using FIG. 13, the present exemplary embodiment is not limited thereto. For example, steps S1301 and S1302 can be included between steps S808 and S809 of FIG. 10 according to the second exemplary embodiment or between steps S808 and S809 of FIG. 12 according to the third exemplary embodiment.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-044448, filed Mar. 13, 2020, which is hereby incorporated by reference herein in its entirety.

The invention claimed is:

1. An information processing apparatus comprising:
at least one memory that stores instructions; and
at least one processor that executes the instructions to perform:
displaying a document image and a plurality of entry fields on a screen, wherein the plurality of entry fields is used for entering a plurality of pieces of metadata to be associated with the document image;
automatically entering, when a user selects one of character regions included in the displayed document image with a pointer of a mouse, an optical character recognition result, that is obtained by executing an optical character recognition process for character images included in the selected one character region, into a first entry field that is identified as an input destination among the displayed plurality of entry fields;
moving, in a case where a wheel operation of the mouse is performed by the user in a state that the pointer of the mouse remains in the selected one character region after the optical character recognition result of the selected one character region is entered in the first entry field, the entered optical character recognition result of the selected one character region from the first entry field to a second entry field that is identified according to the wheel operation among the plurality of entry fields;
fixing, in a case where the pointer of the mouse is shifted from the selected one character region by the user after the wheel operation is performed, the optical character recognition result of the selected one character region in the second entry field;
fixing, in a case where the pointer of the mouse is shifted from the selected one character region by the user without performing the wheel operation after the entry of the optical character recognition result of the selected one character region in the first entry field, the optical character recognition result of the selected one character region in the first entry field; and
according to the fixing of the optical character recognition result of the character images, automatically identifying a blank entry field as a next input destination among the plurality of entry fields without a user's further operation.

2. The information processing apparatus according to claim 1, wherein the at least one processor executes the instructions to further perform:
automatically moving a cursor to the entry field that is automatically identified as the next input destination.

3. The information processing apparatus according to claim 1, wherein the at least one processor executes the instructions to further perform:
 entering, in a case where a character string is keyed in by the user using a keyboard, the keyed in character string in the entry field that is identified as the input destination among the plurality of entry fields.

4. The information processing apparatus according to claim 1, wherein the plurality of entry fields is displayed on the screen in association with respective item names of the plurality of entry fields.

5. The information processing apparatus according to claim 1, wherein the at least one processor executes the instructions to further perform:
 displaying, in a case where the optical character recognition result of the selected one character region is entered in the first entry field, a partial image of the selected one character region in association with the first entry field.

6. The information processing apparatus according to claim 1, wherein the plurality of entry fields is displayed on the screen.

7. The information processing apparatus according to claim 1, wherein the at least one processor executes the instructions to further perform:
 determining whether accuracy of the optical character recognition result of the selected one character region is higher than or equal to a predetermined threshold value,
 wherein in a case where the accuracy of the optical character recognition result of the selected one character region is determined to be higher than or equal to the predetermined threshold value and the optical character recognition result of the selected one character region is entered in the first entry field, the blank entry field is automatically identified as the next input destination among the plurality of entry fields without a user's further operation.

8. The information processing apparatus according to claim 7, wherein the at least one processor executes the instructions to further perform:
 maintaining, in a case where the accuracy of the optical character recognition result of the selected one character region is determined to be lower than the predetermined threshold value and the optical character recognition result of the selected one character region is entered in the first entry field, the first entry field as the input destination.

9. The information processing apparatus according to claim 1, wherein the at least one processor executes the instructions to further perform:
 changing, in a case where the wheel operation of a mouse is performed by the user before the one of the character regions in the displayed document image is selected by the user, the entry field currently identified as the input destination to an entry field identified based on the wheel operation among the plurality of entry fields.

10. The information processing apparatus according to claim 9, wherein the at least one processor executes the instructions to further perform:
 moving a cursor to the entry field identified based on the wheel operation.

11. A non-transitory computer readable storage medium storing instructions that causes a computer to perform:
 displaying a document image and a plurality of entry fields on a screen, wherein the plurality of entry fields is used for entering a plurality of pieces of metadata to be associated with the document image;
 automatically entering, when a user selects one of character regions included in the displayed document image with a pointer of a mouse, an optical character recognition result, that is obtained by executing an optical character recognition process for character images included in the selected character region, into a first entry field that is identified as an input destination among the displayed plurality of entry fields;
 moving, in a case where a wheel operation of the mouse is performed by the user in a state that the pointer of the mouse remains in the selected one character region after the optical character recognition result of the selected one character region is entered in the first entry field, the entered optical character recognition result of the selected one character region from the first entry field to a second entry field that is identified according to the wheel operation among the plurality of entry fields;
 fixing, in a case where the pointer of the mouse is shifted from the selected one character region by the user after the wheel operation is performed, the optical character recognition result of the selected one character region in the second entry field;
 fixing, in a case where the pointer of the mouse is shifted from the selected one character region by the user without performing the wheel operation after the entry of the optical character recognition result of the selected one character region in the first entry field, the optical character recognition result of the selected one character region in the first entry field; and
 according to the fixing of the optical character recognition result of the character images, automatically identifying a blank entry field as a next input destination among the plurality of entry fields without a user's further operation.

* * * * *